(12) United States Patent
Wang et al.

(10) Patent No.: US 12,276,947 B2
(45) Date of Patent: Apr. 15, 2025

(54) SYSTEMS AND METHODS FOR TIME SYNCHRONIZATION OF MULTIPLE SENSORS IN A VEHICLE

(71) Applicant: BEIJING VOYAGER TECHNOLOGY CO., LTD., Beijing (CN)

(72) Inventors: Hua Wang, Beijing (CN); Fenglei Wang, Beijing (CN); Zhenqiang Yan, Beijing (CN)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 886 days.

(21) Appl. No.: 17/443,254

(22) Filed: Jul. 23, 2021

(65) Prior Publication Data

US 2021/0356915 A1    Nov. 18, 2021

Related U.S. Application Data

(63) Continuation of application No. PCT/CN2019/080969, filed on Apr. 2, 2019.

(30) Foreign Application Priority Data

Mar. 29, 2019 (CN) .......................... 201910251313.7

(51) Int. Cl.
   *G06F 1/12* (2006.01)
   *G01S 19/42* (2010.01)
   (Continued)

(52) U.S. Cl.
   CPC ............ *G04R 20/04* (2013.01); *G01S 19/421* (2013.01); *G01S 19/47* (2013.01); *H04J 3/0644* (2013.01); *H04J 3/0655* (2013.01); *G06F 1/12* (2013.01)

(58) Field of Classification Search
   CPC ........ G04R 20/04; G04R 20/02; G04R 20/26; G01S 19/421; G01S 19/47; H04J 3/0644;
   (Continued)

(56) References Cited

U.S. PATENT DOCUMENTS 6,167,346 A      12/2000   Fukawa
6,377,211 B1 *    4/2002   Hsiung .................. H01Q 1/125
                                                              342/359

(Continued)

FOREIGN PATENT DOCUMENTS

CN      101949715 A    1/2011
CN      102882586 A    1/2013
(Continued)

OTHER PUBLICATIONS

International Search Report in PCT/CN2019/080969 mailed on Dec. 30, 2019, 4 pages.

(Continued)

*Primary Examiner* — Danny Chan
(74) *Attorney, Agent, or Firm* — Metis IP LLC

(57) ABSTRACT

A method for time synchronization in a vehicle may include transmitting, by a satellite navigation device to a controller and at least one LiDAR device, a UTC and a PPS signal. The satellite navigation device may have a first clock. The method may include synchronizing, by the controller, a second clock of the controller with the first clock of the satellite navigation device based on the PPS signal and the UTC. The method may include synchronizing, by the at least one LiDAR device, a third clock of the at least one LiDAR device with the first clock of the satellite navigation device based on the PPS signal and the UTC. The method may include synchronizing, by at least one camera, a fourth clock of the at least one camera with the second clock of the controller.

18 Claims, 5 Drawing Sheets

(51) Int. Cl.
*G01S 19/47* (2010.01)
*G04R 20/04* (2013.01)
*H04J 3/06* (2006.01)

(58) Field of Classification Search
CPC ...... H04J 3/0655; H04J 3/0667; H04J 3/0638; H04J 3/065; G06F 1/12; H04W 4/80; H04W 4/40
See application file for complete search history.

(56) References Cited

U.S. PATENT DOCUMENTS

| | | | |
|---|---|---|---|
| 7,660,330 B1 | 2/2010 | Shmilovici | |
| 9,596,666 B1* | 3/2017 | Sibenac | H04W 4/70 |
| 2004/0017312 A1* | 1/2004 | Anderson | G01S 5/021 |
| | | | 342/457 |
| 2005/0180263 A1* | 8/2005 | Lambert | G01S 5/26 |
| | | | 367/128 |
| 2009/0091495 A1* | 4/2009 | Meyers | G01S 19/235 |
| | | | 342/357.58 |
| 2010/0128842 A1* | 5/2010 | Meng | A61B 6/56 |
| | | | 378/19 |
| 2010/0204918 A1* | 8/2010 | Joo | G04R 20/02 |
| | | | 701/469 |
| 2010/0220006 A1* | 9/2010 | Arab | G04G 7/026 |
| | | | 342/357.26 |
| 2014/0086234 A1* | 3/2014 | Ogawa | H04J 3/0638 |
| | | | 370/350 |
| 2015/0120035 A1 | 4/2015 | Mayer | |
| 2016/0050356 A1* | 2/2016 | Nalepka | H04N 7/181 |
| | | | 348/148 |
| 2016/0191752 A1 | 6/2016 | Takitsune et al. | |
| 2017/0231508 A1 | 8/2017 | Edwards et al. | |
| 2021/0218488 A1* | 7/2021 | Zhang | H04W 84/18 |
| 2021/0235010 A1* | 7/2021 | Wallace | H04N 13/25 |

FOREIGN PATENT DOCUMENTS

| | | |
|---|---|---|
| CN | 104913766 A | 9/2015 |
| CN | 106885601 A | 6/2017 |
| CN | 107202577 A | 9/2017 |
| CN | 107659367 A | 2/2018 |
| CN | 108282242 A | 7/2018 |
| CN | 109217959 A | 1/2019 |

OTHER PUBLICATIONS

Written Opinion in PCT/CN2019/080969 mailed on Dec. 30, 2019, 4 pages.
First Office Action in Chinese Application No. 201910251313.7 mailed on Feb. 26, 2021, 16 pages.
Notification to Grant Patent Right for Invention in Chinese Application No. 201910251313.7 mailed on Jun. 24, 2021, 6 pages.

* cited by examiner

500

| 510 | Transmitting an initial data package to the controller, the initial data package including a first timestamp according to a fifth clock of the at least one camera, the first timestamp indicating a time when the at least one camera transmits the initial data package |

↓

| 520 | Receiving a modified data package from the controller, the modified data package including a second timestamp indicating a time when the controller receives the initial data message and a third timestamp indicating a time when the controller transmits the modified data package according to a second clock of the controller |

↓

| 530 | Recording, after receiving the modified data package, a fourth timestamp according to the fifth clock indicating a time when the at least one camera receives the modified data package from the controller |

↓

| 540 | Determining an offset between the second clock and the fifth clock based on the first timestamp, the second timestamp, the third timestamp, and the fourth timestamp |

↓

| 550 | Synchronizing the fifth clock with the second clock based on the offset |

FIG. 5

SYSTEMS AND METHODS FOR TIME SYNCHRONIZATION OF MULTIPLE SENSORS IN A VEHICLE

CROSS-REFERENCE TO RELATED APPLICATIONS

This application is a continuation of International Application No. PCT/CN2019/080969, filed on Apr. 2, 2019, which claims priority to Chinese Patent Application No. 201910251313.7 filed on Mar. 29, 2019, the contents of each of which are incorporated herein by reference.

TECHNICAL FIELD

The present disclosure generally relates to time synchronization, and more specifically, relates to systems and methods for time synchronization of multiple sensors in a vehicle.

BACKGROUND

An autonomous vehicle is a vehicle capable of sensing its environment and navigating with little or no human input. The autonomous vehicle usually combines a variety of sensors to perceive the surroundings, such as radar, computer vision (e.g., cameras), light detection and ranging (LiDAR) devices, sonar, devices with positioning technology, odometer, and inertial measurement units (IMU). The positioning, environment sensing, and controlling of the autonomous vehicle can be realized based on the coordination of the multiple sensors, and such coordination is essential to the autonomous driving technology. Time synchronization of the multiple sensors is a key operation to achieve smooth coordination of the multiple sensors. Therefore, it is desirable to provide systems and methods that can efficiently and precisely synchronize the clocks of the multiple sensors in the autonomous vehicle.

SUMMARY

According to an aspect of the present disclosure, a vehicle may include a satellite navigation device, at least one light detection and ranging (LiDAR) device, at least one camera, and a controller. A method for time synchronization in the vehicle may include one or more of the following operations. The satellite navigation device may transmit, to the controller and the at least one LiDAR device, a coordinated universal time (UTC) and a pulse per second (PPS) signal. The PPS signal may incorporate integer second information of the UTC. The satellite navigation device may have a first clock. The controller may synchronize a second clock of the controller with the first clock of the satellite navigation device based on the PPS signal and the UTC. The at least one LiDAR device may synchronize a third clock of the at least one LiDAR device with the first clock of the satellite navigation device based on the PPS signal and the UTC. The at least one camera may synchronize a fourth clock of the at least one camera with the second clock of the controller.

In some embodiments, to synchronize, by the at least one camera, the fourth clock of the at least one camera with the second clock of the controller, the at least one camera may transmit an initial data package to the controller. The initial data package may include a first timestamp according to the fourth clock of the at least one camera. The first timestamp may indicate a time when the at least one camera transmits the initial data package. After receiving the initial data package, the controller may transmit a modified data package to the at least one camera. The modified data package may include a second timestamp indicating a time when the controller receives the initial data package and a third timestamp indicating a time when the controller transmits the modified data package according to the second clock. After receiving the modified data package, the at least one camera may record a fourth timestamp according to the fourth clock of the at least one camera, indicating a time when the at least one camera receives the modified data package from the controller. The at least one camera may determine an offset between the second clock and the fourth clock based on the first timestamp, the second timestamp, the third timestamp, and the fourth timestamp. The at least one camera may synchronize the fourth clock with the second clock based on the offset.

In some embodiments, to determine, by the at least one camera, the offset between the second clock and the fourth clock based on the first timestamp, the second timestamp, the third timestamp, and the fourth timestamp, the at least one camera may determine a delay of the initial data package or the modified data package of a single trip between the controller and the at least one camera based on the first timestamp, the second timestamp, the third timestamp, and the fourth timestamp. The at least one camera may determine the offset based on the delay.

In some embodiments, the satellite navigation device may receiving, from one or more satellites, navigation signals. The satellite navigation device may determine the PPS signal and the UTC based on the navigation signals.

In some embodiments, the PPS signals and the UTC may be transmitted to the controller or the at least one LiDAR device at the same time.

In some embodiments, the UTC may be transmitted to the controller or the at least one LiDAR device after a period of time when the PPS signal is transmitted to the controller or the at least one LiDAR device.

In some embodiments, the vehicle may further include an inertial navigation system (INS). The INS may receive the PPS signal and the UTC from the satellite navigation device. The INS may synchronize a fifth clock of the INS with the first clock of the satellite navigation device based on the PPS signal and the UTC.

In some embodiments, the PPS signal may be processed by performing amplification or optoelectronic isolation when the PPS signal is transmitted to the controller or the at least one LiDAR.

In some embodiments, the PPS signal may be processed by filtering high-frequency noise in the PPS signal when the PPS signal is transmitted to the controller or the at least one LiDAR.

In some embodiments, the high-frequency noise in the PPS signal may be filtered using a magnet ring.

According to another aspect of the present disclosure, a system for time synchronization in a vehicle may include a satellite navigation device having a first clock, configured to transmit a pulse per second (PPS) signal and a coordinated universal time (UTC). The PPS signal may incorporate integer second information of the UTC. The system may also include a controller, configured to receive the PPS signal and the UTC from the satellite navigation device and synchronize a second clock of the controller with the first clock of the satellite navigation device based on the PPS signal and the UTC. The system may also include at least one LiDAR device, configured to receive the PPS signal and the UTC from the satellite navigation device and synchronize a third clock of the at least one LiDAR device with the first clock of the satellite navigation device based on the PPS signal and the UTC. The system may also include at least one camera, configured to synchronize a fourth clock of the at least one camera with the second clock of the controller.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for synchronizing a clock of at least one camera with a clock of a controller according to some embodiments of the present disclosure.

DETAILED DESCRIPTION

Figure 1:
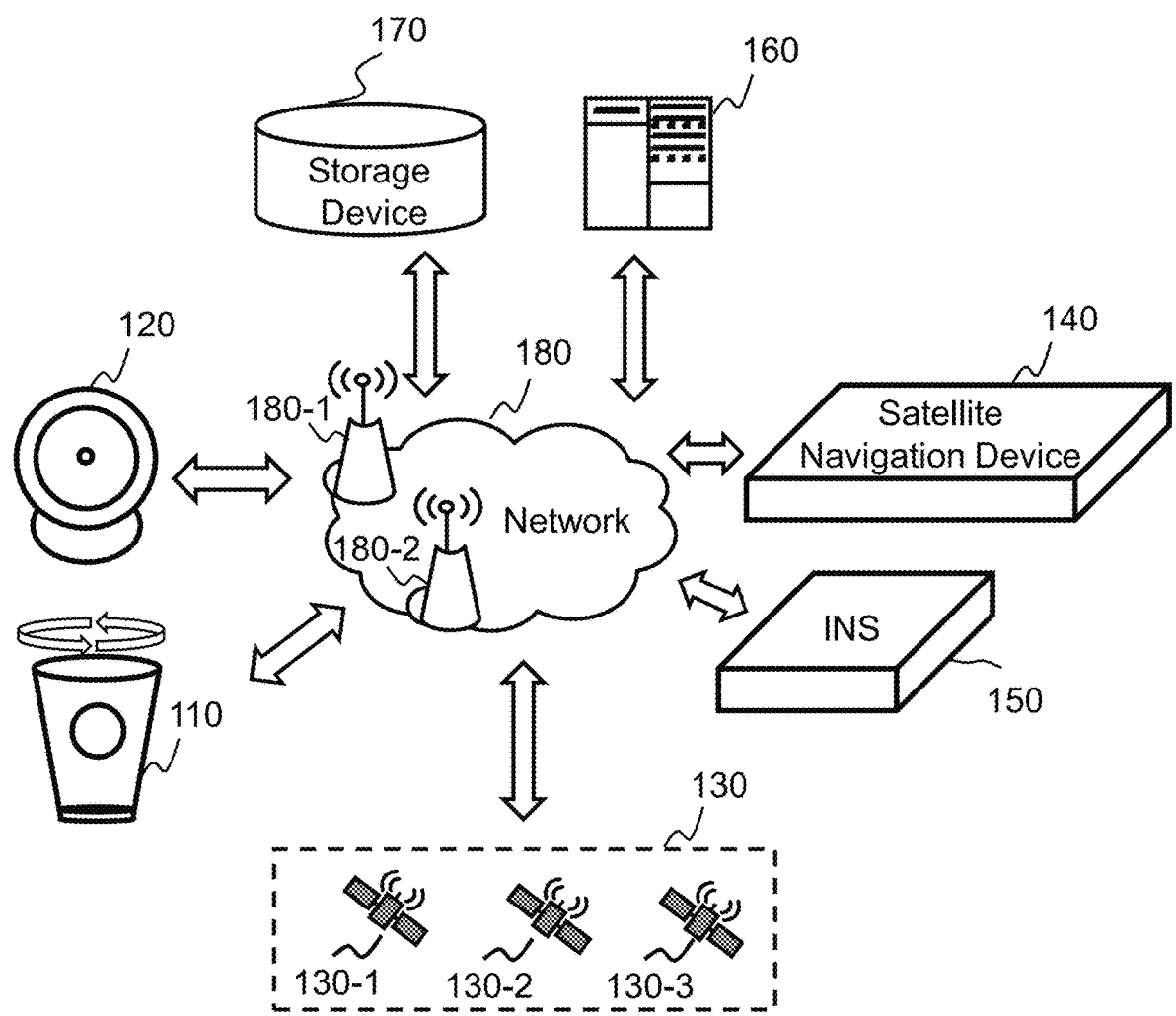
FIG. 1 is a schematic diagram illustrating an exemplary time synchronization system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The systems and methods in the present disclosure may be applied to different scenarios in which clocks of different components are required to be synchronized. For example, the systems and methods in the present disclosure may be applied to time synchronization of different components (e.g., sensors) in a vehicle. The vehicle may be applied to land, ocean, aerospace, or the like, or any combination thereof. The vehicle may include a taxi, a private car, a hitch, a bus, a train, a bullet train, a high speed train, a subway, a vessel, an aircraft, a spaceship, a hot-air balloon, a driverless vehicle, a bicycle, a tricycle, a motorcycle, an autonomous vehicle, or the like, or any combination thereof. As another example, the systems and methods in the present disclosure may be applied to time synchronization of different components (e.g., sensors) in a smart device. The smart device may include a smart home device (e.g., a smart lighting device, a controller of an intelligent electrical apparatus, a smart monitoring device, a smart television, a smart video camera, an interphone, etc.), a smart wearable device (e.g., a smart bracelet, a smart footgear, a smart glass, a smart helmet, a smart watch, a smart clothing, a smart backpack, a smart accessory, etc.), a smart mobile device (e.g., a smartphone, a personal digital assistance (PDA), a gaming device, a navigation device, a point of sale (POS) device, etc.), a robot, or the like, or any combination.

It is necessary and/or desirable to efficiently and precisely synchronize the clocks of multiple sensors in a vehicle (e.g., an autonomous vehicle). To this end, systems and methods for time synchronization in the present disclosure combines hardware time synchronization (e.g., based on pulse per second (PPS) signals and coordinated universal time (UTC)) with software time synchronization (e.g., using a network time protocol (NTP)) to synchronize the clocks of multiple sensors in a vehicle. A sensor (e.g., a LiDAR device, an inertial navigation system (INS), a controller of the vehicle) that obtains data at a relatively high frequency (e.g., greater than 20 HZ) may perform hardware time synchronization because the precision of time synchronization is required to be higher in this case. A sensor (e.g., a camera) that obtains data at a relatively low frequency (e.g., lower than 10 HZ) may perform software time synchronization because the precision of time synchronization is required to be relatively lower in this case.

For brevity, the description of the methods and/or systems for time synchronization in the present disclosure may take vehicles as an example. It should be noted that the methods and/or systems for time synchronization described below are merely some examples or implementations. For persons having ordinary skills in the art, the methods and/or systems for time synchronization in the present disclosure may be applied to other similar situations, such as smart devices.

FIG. 1 is a schematic diagram of an exemplary time synchronization system according to some embodiments of the present disclosure. The time synchronization system 100 may include at least one LiDAR device 110, at least one camera 120, a positioning system 130, a satellite navigation device 140, an inertial navigation system (INS) (also referred to as IMU) 150, a controller 160, a storage device 170, and a network 180. In some embodiments, the at least one LiDAR device 110, the at least one camera 120, the satellite navigation device 140, the INS 150, the controller 160, and the storage device 170 may be included in a vehicle.

In some embodiments, the LiDAR device 110 may include a laser emitter, a scanning and optical component, and a photosensitive component. The laser emitter may be configured to emit laser beams with a certain wavelength. For example, the laser emitter may emit laser beams of which the wavelength ranges from 600 nm to 1000 nm. In some embodiments, the LiDAR device 110 may be configured to obtain point sets including a plurality of points relating to objects (e.g., a person, an animal, a tree, a roadblock, building, or a vehicle) that are within the scope of the LiDAR device 110 (e.g., a distance, say 500 meters, from the vehicle). A point in a point set may include three-dimensional (3D) coordinates of the point and a reflection intensity of the point. The reflection intensity of the point may refer to the intensity of a laser beam reflected by the point.

In some embodiments, the LiDAR device 110 may emit a plurality of laser beams and rotate at a certain angular velocity to make the plurality of laser beams shine on objects that are within a distance (e.g., 500 meters) from the vehicle such that the LiDAR device 110 may obtain a point set including a plurality of points relating to the objects. For example, the LiDAR device 110 may obtain a point set when the LiDAR device 110 completes a rotation of 360°.

In some embodiments, because objects surrounding the vehicle may constantly be changing, the LiDAR device 110 may constantly emit laser beams and constantly obtain point sets relating to the objects surrounding the vehicle. In some embodiments, the LiDAR device 110 may transmit the point sets to the storage device 170 and/or the controller 160.

The camera 120 may be configured to obtain one or more images relating to objects (e.g., a person, an animal, a tree, a roadblock, building, or a vehicle) that are within the scope of the camera 120 (e.g., a distance, for instance, 500 meters from the vehicle). As used in this application, an image may be a still image, a video, a streaming video, or a video frame obtained from a video. In some embodiments, the camera 120 may be a digital camera, a web camera, a smartphone, a tablet, a laptop, a video gaming console equipped with a web camera, a camera with multiple lenses, etc. In some embodiment, the camera 120 may be configured to capture two-dimensional (2D) images and/or three-dimensional (3D) images. For example, the camera 120 may be a static camera, a pan-tilt-zoom camera, a moving camera, a stereoscopic camera, a structured light camera, a time-of-flight camera, etc. In some embodiments, the camera 120 may also be a camera equipped with time-of-flight device, a Kinect sensor, a 3D laser scanner, a photographic scanner, etc. In some embodiments, the camera 120 may rotate to capture an image including objects surrounding the vehicle. For example, the camera 120 may obtain an image when the camera 120 completes a rotation of 360°.

In some embodiments, because objects surrounding the vehicle may constantly be changing, the camera 120 may constantly capture images relating to the objects surrounding the vehicle. In some embodiments, the obtaining of a point set of the LiDAR device 110 and the capture of an image of the camera 120 may be simultaneous such that the points in the point set may correspond to the pixels in the image. In some embodiments, the camera 120 may transmit the image(s) to the storage device 170 and/or the controller 160.

The positioning system 130 may include one or more satellites, for example, a satellite 130-1, a satellite 130-2, and a satellite 130-3. In some embodiments, the positioning system 130 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The positioning system 130 may transmit navigation signals to the satellite navigation device 140 via wireless connections.

The satellite navigation device 140 may determine location information and time information of the satellite navigation device 140 by processing the navigation signals. The location information may be in the form of coordinates, such as, latitude coordinate and longitude coordinate, etc.

The INS 150 may be a navigation device that uses a processor and inertial sensors, such as motion sensors (e.g., accelerometers) and rotation sensors (e.g., gyroscopes), to continuously determine by dead reckoning the position, the orientation, and the velocity (direction and speed of movement) of a moving object without the need for external references. In some embodiments, the inertial sensors may be supplemented by a barometric altimeter. In some embodiments, the inertial sensors may be supplemented by magnetic sensors (e.g., magnetometers) and/or speed measuring devices.

In some embodiments, the controller 160 may process information and/or data to perform one or more functions described in the present disclosure. For example, the controller 160 may interpret sensory information (e.g., the point sets from the LiDAR device 110, the images from the camera 120, the position information and time information from the satellite navigation device 140, and the orientation, the velocity, and the acceleration from the INS 150) to control the speed and the driving direction of the autonomous vehicle, and identify appropriate navigation paths, obstacles, and relevant signage. As another example, the controller 160 may synchronize a clock of the controller 160 with a clock of the satellite navigation device 140.

In some embodiments, the controller 160 may be local or remote. For example, the controller 160 may access information and/or data stored in the camera 120, the LiDAR device 110, the satellite navigation device 140, the INS 150, and/or the storage device 170 via the network 180. As another example, the controller 160 may be directly connected to the camera 120, the LiDAR device 110, the satellite navigation device 140, the INS 150, and/or the storage device 170 to access stored information and/or data. In some embodiments, the controller 160 may be implemented on a computing device 200 having one or more components illustrated in FIG. 2 or implemented on a mobile device 300 having one or more components illustrated in FIG. 3 in the present disclosure.

In some embodiments, the controller 160 may include one or more processing engines (e.g., single-core processing engine(s) or multi-core processor(s)). Merely by way of example, the controller 160 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 170 may store data and/or instructions. In some embodiments, the storage device 170 may store data obtained from the controller 160, the camera 120, the LiDAR device 110, the satellite navigation device 140, and/or the INS 150. For example, the storage device 170 may store images captured by the camera 120. As another example, the storage device 170 may store point sets obtained from the LiDAR device 110. In some embodiments, the storage device 170 may store data and/or instructions that may be executed or used to perform exemplary methods described in the present disclosure. For example, the storage device 170 may store instructions that the controller 160 may execute to control the autonomous vehicle. In some embodiments, the storage device 170 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 170 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 170 may be connected to the network 180 to communicate with one or more components in the time synchronization system 100 (e.g., the controller 160, the camera 120, the LiDAR device 110, and/or the satellite navigation device 140, the INS 150). One or more components in the time synchronization system 100 may access the data or instructions stored in the storage device 170 via the network 180. In some embodiments, the storage device 170 may be directly connected to or communicate with one or more components in the time synchronization system 100 (e.g., the controller 160, the camera 120, the LiDAR device 110, and/or the satellite navigation device 140, the INS 150). In some embodiments, the storage device 170 may be part of the LiDAR device 110, the camera 120, the satellite navigation device 140, the INS 150, or the controller 160.

The network 180 may facilitate the exchange of information and/or data. In some embodiments, one or more components in the time synchronization system 100 (e.g., the controller 160, the camera 120, the LiDAR device 110, the storage device 170, the positioning system 130, the satellite navigation device 140, and the INS 150) may send/obtain information and/or data to/from other component(s) in the time synchronization system 100 via the network 180. For example, the satellite navigation device 140 may receive navigation signals from the positioning system 130 via the network 180. As another example, the camera 120 may transmit, to the controller 160, a data package via the network 180. In some embodiments, the network 180 may be any type of wired or wireless network, or a combination thereof. Merely by way of example, the network 180 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth™ network, a ZigBee network, a near field communication (NFC) network, a mobile network, or the like, or any combination thereof. In some embodiments, the network 180 may include one or more network access points. For example, the network 180 may include wired or wireless network access points such as base stations and/or internet exchange points 180-1, 180-2, . . . , through which one or more components of the time synchronization system 100 may be connected to the network 180 to exchange data and/or information.

In some embodiments, the components in the time synchronization system 100 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

Figure 2:
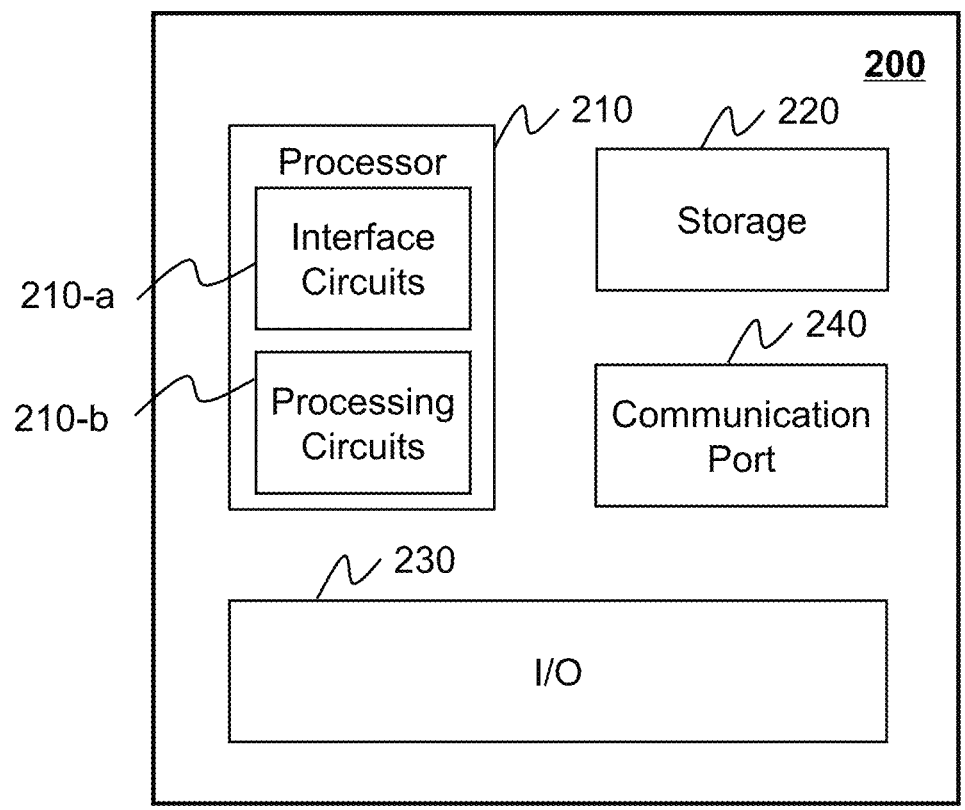
FIG. 2 is a schematic diagram illustrating exemplary hardware and/or software components of a computing device according to some embodiments of the present disclosure.

FIG. 2 is a schematic diagram illustrating exemplary hardware and/or software components of a computing device on which the LiDAR device 110, the camera 120, the satellite navigation device 140, the INS 150, and/or the controller 160 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions in accordance with techniques described herein. For example, the processor 210 may include interface circuits 210-*a* and processing circuits 210-*b* therein. The interface circuits 210-*a* may be configured to receive electronic signals from a bus (not shown in FIG. 2), wherein the electronic signals encode/include structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the controller 160 may be implemented on the computing device 200. The processor 210 may synchronize a clock of the controller 160 with a clock of the satellite navigation device 140. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the LiDAR device 110, the camera 120, the satellite navigation device 140, the INS 150, the controller 160, and/or any other component of the time synchronization system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input and/or output signals, data, information, etc. In some embodiments, the I/O 230 may enable a user interaction with the controller 160. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 180) to facilitate data communications. For example, the controller 160 may be implemented on the computing device 200. The communication port 240 may establish connections between the controller 160 and the LiDAR 110, the camera 120, the satellite navigation device 140, the INS 150, or the storage device 170. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc.

Figure 3:
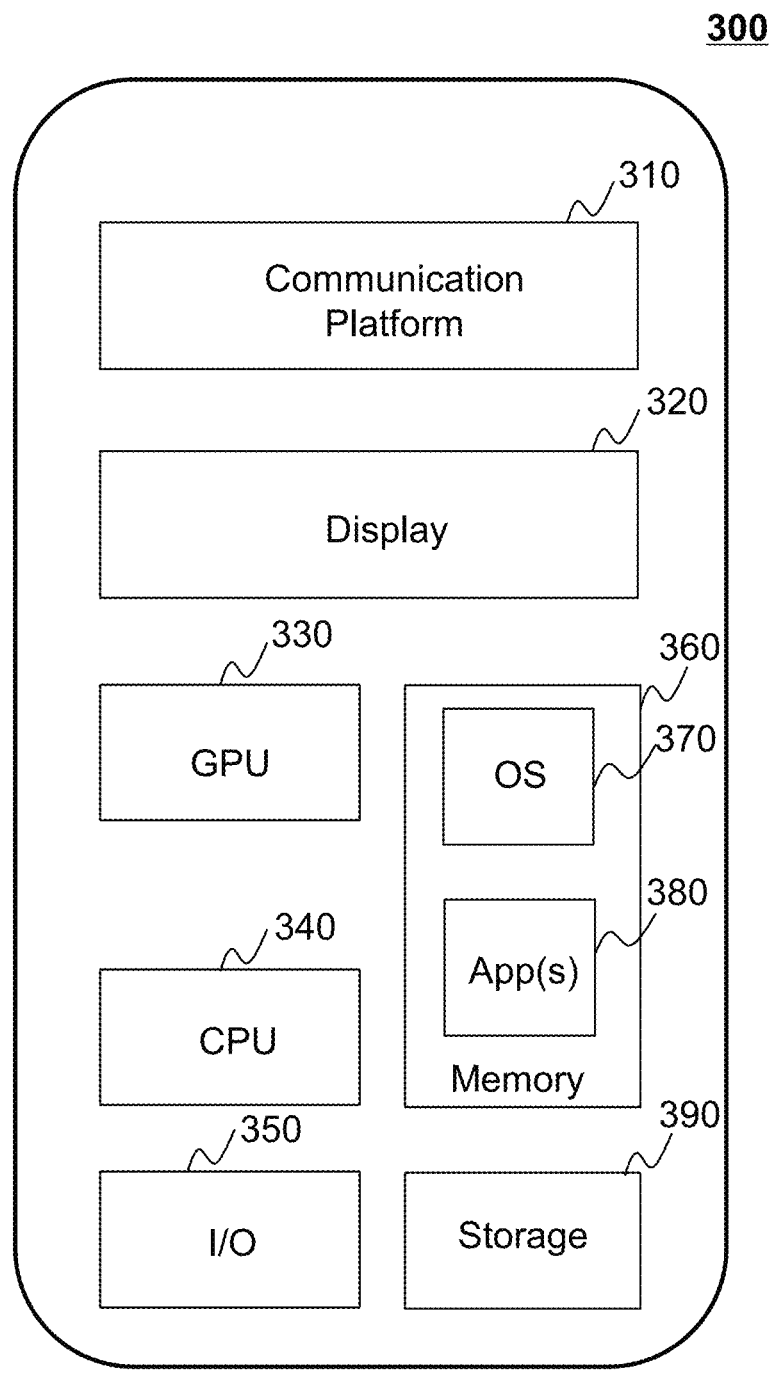
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device on which the controller 160 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the time synchronization system 100 or other information from the controller 160. User interactions with the information stream may be achieved via the I/O 350 and provided to the controller 160 and/or other components of the time synchronization system 100 via the network 180. Merely by way of example, the state of a task may be displayed in the user terminal 140 through the display 320. As another example, a user may input a task through the I/O 350.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the time synchronization system 100 performs, the element may perform through electrical signals and/or electromagnetic signals. For example, when the controller 160 processes a task, such as making a determination, or identifying information, the controller 160 may operate logic circuits in its processor to process such task. When the controller 160 receives data (e.g., a data package) from the camera 120, a processor of the controller 160 may receive electrical signals encoding/including the data. The processor of the controller 160 may receive the electrical signals through one or more information exchange ports. If the controller 160 communicates with the camera 120 via a wired network, the information exchange port may be physically connected to a cable. If the controller 160 communicates with the camera 120 via a wireless network, the information exchange port of the controller 160 may be one or more antennas, which may convert the electrical signals to electromagnetic signals. Within an electronic device, such as the LiDAR device 110, the camera 120, the satellite navigation device 140, the INS 150, and/or the controller 160, when a processor thereof processes an instruction, sends out an instruction, and/or performs an action, the instruction and/or action is conducted via electrical signals. For example, when the processor retrieves or saves data from a storage medium (e.g., the storage device 170), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4:
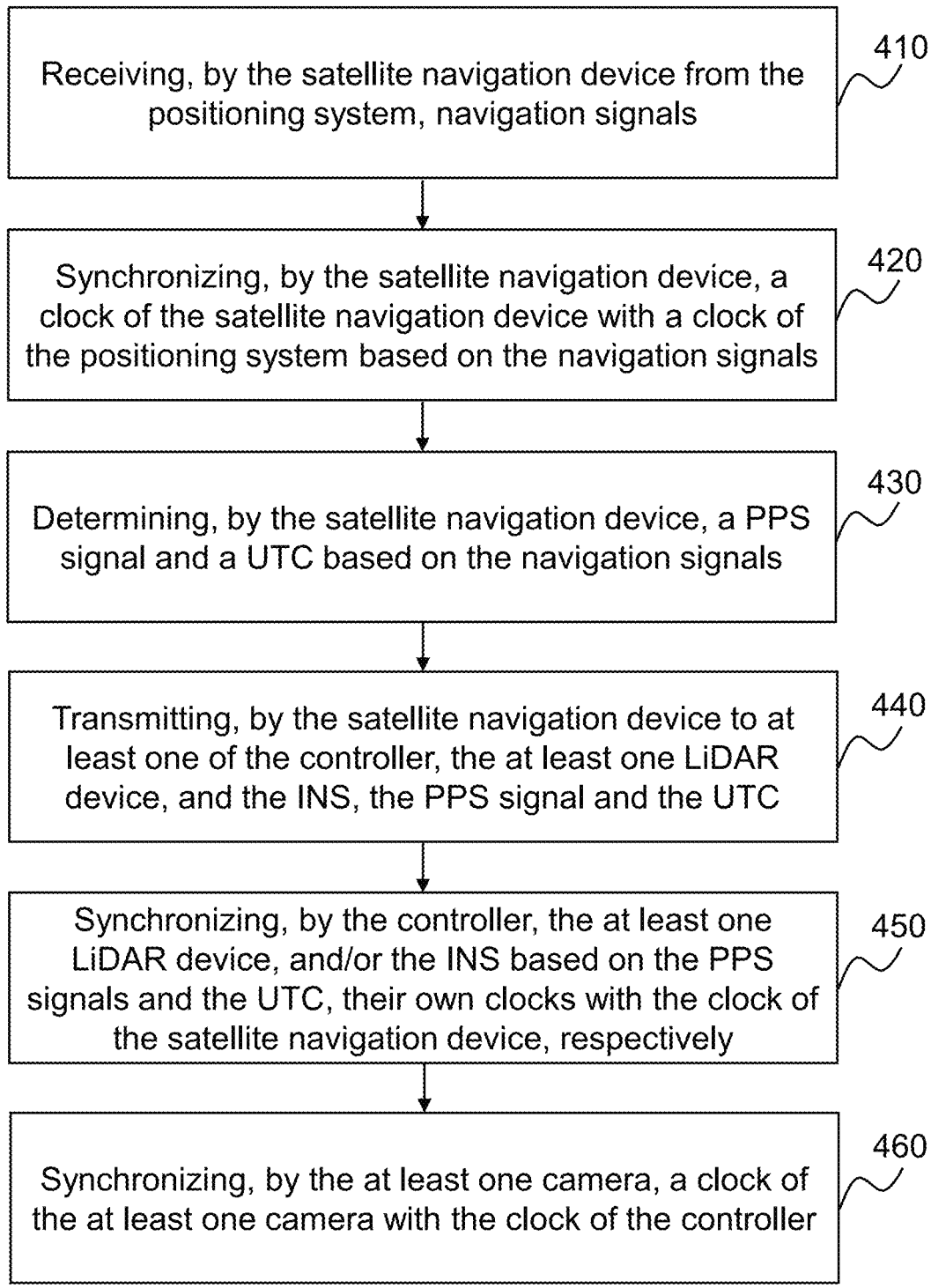
FIG. 4 is a flowchart illustrating an exemplary process for time synchronization according to some embodiments of the present disclosure.

FIG. 4 is a flowchart illustrating an exemplary process for time synchronization according to some embodiments of the present disclosure. In some embodiments, the process 400 may be implemented in the time synchronization system 100 illustrated in FIG. 1. For example, at least one operation (e.g., operation 450) of the process 400 that is performed by a component (e.g., the camera 120) of the time synchronization system 100 may be stored in a storage medium (e.g., the storage device 170, the storage 220 of the camera 120) as a form of instructions, and can be invoked and/or executed by the component (e.g., the processor 210 of the camera 120). The operations of the illustrated process 400 presented below are intended to be illustrative. In some embodiments, the process 400 may be accomplished with one or more additional operations not described, and/or without one or more of the operations discussed. Additionally, the order in which the operations of the process 400 as illustrated in FIG. 4 and described below is not intended to be limiting.

In 410, the satellite navigation device 140 may receive navigation signals from the positioning system 130 (e.g., the satellite 130-1, the satellite 130-2, and/or the satellite 130-3) via wireless connections.

In some embodiments, the satellites in the positioning system 130 carry stable atomic clocks that are synchronized with one another and with the ground clocks. A satellite (e.g., the satellite 130-1, the satellite 130-2, or the satellite 130-3) in the positioning system 130 may continuously broadcast navigation signals (radio signals, and carrier wave with modulation). The navigation signal may be a pseudo-random code (sequence of ones and zeros) that is known to the receivers (e.g., the satellite navigation device 140). The navigation signals may include a transmission time (according to a clock of the satellite) when the navigation signals is transmitted from the satellite and the position of the satellite at the transmission time.

In 420, the satellite navigation device 140 may synchronize a first clock of the satellite navigation device 140 with a clock of the positioning system 130 based on the navigation signals.

In some embodiments, the satellite navigation device 140 may measure an arrival time (according to its own clock, also referred to as a first clock) when the satellite navigation device 140 receives the navigation signals. The satellite navigation device 140 may determine a time of flight (TOF) value of the navigation signals corresponding to a satellite based on the transmission time and the arrival time. In some embodiments, the satellite navigation device 140 may determine the TOF values corresponding to at least four satellites. The satellite navigation device 140 may synchronize the first clock with the satellites' clock by determining clock deviation between the first clock and the satellites' clock, and determine its own 3D position (e.g., the longitude, the latitude, and the altitude) based on the TOF values corresponding to at least four satellites.

In 430, the satellite navigation device 140 may determine a coordinated universal time (UTC) and a pulse per second (PPS) signal based on the navigation signals and/or the first clock.

In 440, the satellite navigation device 140 may transmit the UTC and the PPS signal to at least one of the controller 160, the at least one LiDAR device 110, and the INS 150.

The PPS signal and the UTC may be synchronized with the first clock. The pulse per second is an electrical signal that has a width of less than one second and a sharply rising or abruptly falling edge.

In some embodiments, the satellite navigation device 140 may transmit the PPS signal and/or the UTC periodically. For example, the satellite navigation device 140 may transmit a PPS signal once per second to a component (e.g., the controller 160, the LiDAR device 110, or the INS 150). In this case, the PPS signal may incorporate integer second information of the UTC. For instance, the sharply rising or abruptly falling edge of the PPS signal may indicate integer second information of the UTC.

In some embodiments, the satellite navigation device 140 may transmit a National Marine Electronics Association (NMEA) sentence including the UTC (e.g., in a form of hhmmss.sss), the longitude, the latitude, and the altitude, etc.

In 450, the controller 160, the at least one LiDAR device 110, and/or the INS 150 may respectively synchronize their own clocks (e.g., a second clock of the controller 160, a third clock of the at least one LiDAR device 110, and a fourth clock of the INS 150) with the first clock based on the PPS signal and the UTC. In some embodiments, the controller 160, the at least one LiDAR device 110, and/or the INS 150 may synchronize their own clocks with the first clock using the UTC and reset a counter related to their own clocks using the PPS signal.

In some embodiments, if the time synchronization system 100 includes multiple LiDAR devices, the satellite navigation device 140 may transmit the PPS signal and the UTC to the multiple LiDAR devices. The multiple LiDAR devices may respectively synchronize their own clocks with the first clock based on the PPS signal and the UTC.

In some embodiments, there may be errors in time synchronization based on the PPS signals and the UTC because of, for example, error accumulation in a cycle of transmitting the PPS signals, a delay in transmitting the PPS signals and/or the UTC, failure in receiving and/or analyzing the navigation signals to determine the PPS signal and the UTC, errors related to hardware, etc.

In some embodiments, the error of the time synchronization based on the PPS signals may be accumulated within a cycle. The accumulative error of the time synchronization within one second may be acceptable in some circumstances. In order to further reduce the accumulative error, the satellite navigation device 140 may increase the frequency of transmitting the PPS signals. For example, the satellite navigation device 140 may transmit the PPS signals at a frequency greater than 1 HZ.

In some embodiments, the satellite navigation device 140 may transmit the UTC (e.g., the NMEA sentence) after a period of time of transmitting the PPS signal to increase the robustness of time synchronization and reduce the load for time synchronization of the LiDAR device 110, the INS 150, and/or the controller 160, which may reduce the error of time synchronization.

In some embodiments, it is hard for the satellite navigation device 140 to receive the navigation signals from the positioning system 130 when the satellite navigation device 140 is located in some locations, such as underwater, under-ground, indoors, in tunnels, etc. In such cases, the satellite navigation device 140 cannot receive satellite signals and cannot transmit the UTC (e.g., the NMEA sentence) and the PPS signal to other parts (e.g., the controller 160) of vehicle. In this case, the INS 150 may determine simulated PPS signals based on the clock of the INS 150 and transmit the simulated PPS signals to the at least one LiDAR device 110 and/or the controller 160.

In some embodiments, the PPS signal may be a transistor-transistor logic (TTL) signal, which may have signal attenuation and be affected by noise of other signals when transmitted between two devices (e.g., from the satellite navigation device 140 to the at least one LiDAR device 110, the controller 160, or the INS 150). To reduce the signal attenuation, the PPS signal may be processed by performing amplification (e.g., by a relay amplifier) or optoelectronic isolation when the PPS signal is transmitted to the controller 160, the INS 150, or the at least one LiDAR 110. To reduce the effect of noise of other signals, the PPS signal may be processed by filtering (e.g., using a magnet ring) high-frequency noise in the PPS signal when the PPS signal is transmitted to the controller 160, the INS 150, or the at least one LiDAR 110.

In 460, the at least one camera 120 may synchronize a clock (e.g., a fifth clock) of the at least one camera 120 with the clock (e.g., the second clock) of the controller 160.

In some embodiments, the at least one camera 120 may synchronize the fifth clock with the second clock using a network time protocol (NTP). Details regarding the synchronization of the fifth clock with the second clock may be found elsewhere in the present disclosure (e.g., the description in connection with FIG. 5).

In some embodiments, if the time synchronization system 100 includes multiple cameras, the multiple cameras may respectively synchronize their own clocks with the second clock using the NTP.

In some embodiments, hardware time synchronization (e.g., based on the PPS signals and the UTC) may realize a higher precision of time synchronization (e.g., the error is in a sub-microsecond level). However, the expandability and the flexibility of the hardware time synchronization is limited by different hardware standard and complicated arrangement of hardware. The standard of software time synchronization (e.g., using the NTP) may be relatively unified. However, the software time synchronization may realize a lower precision of time synchronization (e.g., the error is in a millisecond level).

The process 400 for time synchronization of multiple sensors in a vehicle combines hardware time synchronization with software time synchronization. A sensor (e.g., the at least one LiDAR device 110, the INS 150, and the controller 160) that obtains data at a relatively high frequency (e.g., greater than 20 HZ) may perform hardware time synchronization (e.g., operations 440 and 450) because the precision of time synchronization is preferred to be higher in this case. A sensor (e.g., the at least one camera 120) that obtains data at a relatively low frequency (e.g., lower than 10 HZ) may perform software time synchronization (e.g., operation 460) because the precision of time synchronization is not required to be so high in this case. Such a design allows for overall improvement of efficiency and conservation of resources, while at the same time satisfies the requirements of all the devices in the vehicle.

In this disclosure, time synchronization of the above components is taken for example, and is merely provided for the purposes of illustration, and not intended to limit the scope of the present disclosure. In some embodiments, the process 400 for time synchronization in this disclosure may be applied to other components, for example, other sensors in a vehicle, such as radar, sonar, odometer, etc.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 5 is a flowchart illustrating an exemplary process for synchronizing a clock of at least one camera with a clock of a controller according to some embodiments of the present disclosure. In some embodiments, the process 500 may be implemented in the time synchronization system 100 illustrated in FIG. 1. For example, the process 500 may be stored in a storage medium (e.g., the storage device 170, the storage 220 of the camera 120) as a form of instructions, and can be invoked and/or executed by the camera 120 (e.g., the processor 210 of the camera 120). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, operation 450 of the process 400 in FIG. 4 may be performed based on the process 500.

In 510, the at least one camera 120 may transmit an initial data package to the controller 160. The initial data package may include a first timestamp according to the fifth clock of the at least one camera 120. The first timestamp indicates a time when the at least one camera 120 transmits the initial data package.

In 520, the at least one camera 120 may receive a modified data package from the controller 160. The modified data package may include a second timestamp indicating a time when the controller 160 receives the initial data package and a third timestamp indicating a time when the controller 160 transmits the modified data package according to the second clock of the controller 160.

In 530, the at least one camera 120 may record, after receiving the modified data package, a fourth timestamp according to the fifth clock of the at least one camera 120. The fourth timestamp indicates a time when the at least one camera 120 receives the modified data package from the controller 160.

In 540, the at least one camera 120 may determine an offset between the second clock and the fifth clock based on the first timestamp, the second timestamp, the third timestamp, and the fourth timestamp.

The at least one camera 120 may determine a delay of the data package (e.g., the initial data package or the modified data package) of a single trip between the controller 160 and the at least one camera 120 based on the first timestamp, the second timestamp, the third timestamp, and the fourth timestamp. The at least one camera 120 may determine the offset based on the delay.

For example, the at least one camera 120 may determine the delay based on Equation (1) below:

$$T_{delay}=[(T_4-T_1)-(T_3-T_2)]/2 \qquad (1),$$

where it is supposed that the travel times of the data package from the controller 160 to the at least one camera 120 and from the at least one camera 120 to the controller 160 are equal; $T_{delay}$ refers to the delay of the data package of a single trip between the controller 160 and the at least one camera 120; $T_1$, $T_2$, $T_3$, and $T_4$ refers to the first timestamp, the second timestamp, the third timestamp, and the fourth timestamp, respectively.

The at least one camera 120 may determine the offset based on Equation (2) below:

$$T_{offset} = T_2 - (T_1 + T_{delay}) \tag{2},$$

where $T_{offset}$ refers to the offset between the second clock and the fifth clock.

In 550, the at least one camera 120 may synchronize the fifth clock with the second clock based on the offset.

In some embodiments, the at least one camera 120 may transmit the initial data package to the controller 160 at intervals (e.g., once per second).

In some embodiments, if the time synchronization system 100 includes multiple cameras, the multiple cameras may respectively synchronize their own clocks with the second clock based on the process 500.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

After time synchronization of the multiple components in the time synchronization system 100 using the systems and/or the methods (e.g., the process 400 and/or the process 500) in the present disclosure, the precision of the time synchronization may be verified.

For example, data (e.g., point sets) obtained by the at least one LiDAR device 110 may have timestamps according to the synchronized clock of the at least one LiDAR device 110. The controller 160 may read the data obtained by the at least one LiDAR device 110 in real time, and compare the timestamps of the real-time data to the current time of the controller 160 to determine the deviation between the clock of the at least one LiDAR device 110 and the clock of the controller 160. The result is that the deviation is about 0.3 ms.

As another example, a light-emitting diode (LED) is controlled to be on or off based on PPS signals transmitted once per second. The sharply rising edges of the PPS signals indicates integer seconds of the UTC. The response time of the LED is about 10-6s. For instance, after the electricity of the LED is set to be at a high electrical level (e.g., the voltage is higher than 3.5V), the LED is controlled to be on at the sharply rising edge of each PPS signal. After a period of time (e.g., shorter than the width of the PPS signal), the LED is controlled to be off and the electricity of the LED is set to be at a low electrical level (e.g., the voltage is lower than 0.3V). Setting the high and low electrical level is used to determine the duration that the LED is on. The at least one camera 120 may be controlled to capture an image of the LED at integer seconds according to the synchronized clock of the at least one camera 120. In this way, the result is that the camera 120 is able to capture images in which the LED is on and the error of the time synchronization of the at least one camera 120 is about 10 ms.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method for time synchronization in a vehicle, the vehicle including a satellite navigation device, at least one light detection and ranging (LiDAR) device, at least one camera, and a controller, the method comprising:
    transmitting, by the satellite navigation device to the controller and the at least one LIDAR device, a coordinated universal time (UTC) and a pulse per second (PPS) signal, the PPS signal incorporating integer second information of the UTC, the satellite navigation device having a first clock;
    synchronizing, by the controller, a second clock of the controller with the first clock of the satellite navigation device based on the PPS signal and the UTC;
    synchronizing, by the at least one LiDAR device, a third clock of the at least one LIDAR device with the first clock of the satellite navigation device based on the PPS signal and the UTC;
    transmitting, by the at least one camera, an initial data package to the controller, the initial data package including a first timestamp according to a fourth clock of the at least one camera, the first timestamp indicating a time when the at least one camera transmits the initial data package;
    transmitting, by the controller after receiving the initial data package, a modified data package to the at least one camera, the modified data package including a second timestamp indicating a time when the controller receives the initial data package and a third timestamp indicating a time when the controller transmits the modified data package according to the second clock;
    recording, by the at least one camera after receiving the modified data package, a fourth timestamp according to the fourth clock of the at least one camera, indicating a time when the at least one camera receives the modified data package from the controller;
    determining, by the at least one camera, an offset between the second clock and the fourth clock based on the first timestamp, the second timestamp, the third timestamp, and the fourth timestamp; and
    synchronizing, by the at least one camera, the fourth clock of the at least one camera with the second clock of the controller based on the offset.

2. The method of claim 1, wherein determining, by the at least one camera, the offset between the second clock and the fourth clock based on the first timestamp, the second timestamp, the third timestamp, and the fourth timestamp includes:
    determining, by the at least one camera, a delay of the initial data package or the modified data package of a single trip between the controller and the at least one camera based on the first timestamp, the second timestamp, the third timestamp, and the fourth timestamp; and
    determining, by the at least one camera, the offset based on the delay.

3. The method of claim 1, further comprising:
    receiving, by the satellite navigation device from one or more satellites, navigation signals; and
    determining, by the satellite navigation device, the PPS signal and the UTC based on the navigation signals.

4. The method of claim 1, wherein the PPS signals and the UTC are transmitted to the controller or the at least one LiDAR device at the same time.

5. The method of claim 1, wherein the UTC are transmitted to the controller or the at least one LiDAR device after a period of time when the PPS signal is transmitted to the controller or the at least one LiDAR device.

6. The method of claim 1, wherein the vehicle further includes an inertial navigation system (INS);
    the method further comprising:
    receiving, by the INS, the PPS signal and the UTC from the satellite navigation device; and
    synchronizing, by the INS, a fifth clock of the INS with the first clock of the satellite navigation device based on the PPS signal and the UTC.

7. The method of claim 1, wherein the PPS signal is processed by performing amplification or optoelectronic isolation when the PPS signal is transmitted to the controller or the at least one LiDAR.

8. The method of claim 1, wherein the PPS signal is processed by filtering high-frequency noise in the PPS signal when the PPS signal is transmitted to the controller or the at least one LiDAR.

9. The method of claim 8, wherein the high-frequency noise in the PPS signal is filtered using a magnet ring.

10. A system for time synchronization in a vehicle, comprising:
    a satellite navigation device having a first clock, configured to transmit a pulse per second (PPS) signal and a coordinated universal time (UTC), the PPS signal incorporating integer second information of the UTC;
    a controller, configured to
    receive the PPS signal and the UTC from the satellite navigation device; and
    synchronize a second clock of the controller with the first clock of the satellite navigation device based on the PPS signal and the UTC;
    at least one LiDAR device, configured to
    receive the PPS signal and the UTC from the satellite navigation device; and synchronize a third clock of the at least one LiDAR device with the first clock of the satellite navigation device based on the PPS signal and the UTC; and at least one camera, configured to transmit, by the at least one camera, an initial data package to the controller, the initial data package including a first timestamp according to a fourth clock of the at least one camera, the first timestamp indicating a time when the at least one camera transmits the initial data package;

transmit, by the controller after receiving the initial data package, a modified data package to the at least one camera, the modified data package including a second timestamp indicating a time when the controller receives the initial data package and a third timestamp indicating a time when the controller transmits the modified data package according to the second clock;

record, by the at least one camera after receiving the modified data package, a fourth timestamp according to the fourth clock of the at least one camera, indicating a time when the at least one camera receives the modified data package from the controller;

determine, by the at least one camera, an offset between the second clock and the fourth clock based on the first timestamp, the second timestamp, the third timestamp, and the fourth timestamp; and synchronize the fourth clock of the at least one camera with the second clock of the controller based on the offset.

11. The system of claim 10, wherein determining, by the at least one camera, the offset between the second clock and the fourth clock based on the first timestamp, the second timestamp, the third timestamp, and the fourth timestamp includes:

determining, by the at least one camera, a delay of the initial data package or the modified data package of a single trip between the controller and the at least one camera based on the first timestamp, the second timestamp, the third timestamp, and the fourth timestamp; and determining, by the at least one camera, the offset based on the delay.

12. The system of claim 10, wherein the satellite navigation device is further configured to receive navigation signals from one or more satellites; and determine the PPS signal and the UTC based on the navigation signals.

13. The system of claim 10, wherein the PPS signals and the UTC are transmitted to the controller or the at least one LiDAR device at the same time.

14. The system of claim 10, wherein the UTC are transmitted to the controller or the at least one LiDAR device after a period of time when the PPS signal is transmitted to the controller or the at least one LiDAR device.

15. The system of claim 10, further comprising an inertial navigation system (INS) configured to receive the PPS signal and the UTC from the satellite navigation device; and synchronize a fifth clock of the INS with the first clock of the satellite navigation device based on the PPS signal and the UTC.

16. The system of claim 10, wherein the PPS signal is processed by performing amplification or optoelectronic isolation when the PPS signal is transmitted to the controller or the at least one LiDAR.

17. The system of claim 10, wherein the PPS signal is processed by filtering high-frequency noise in the PPS signal when the PPS signal is transmitted to the controller or the at least one LiDAR.

18. The system of claim 17, wherein the high-frequency noise in the PPS signal is filtered using a magnet ring.

* * * * *